United States Patent [19]
Humphrey

[11] 3,874,774
[45] Apr. 1, 1975

[54] EYE TEST APPARATUS

[75] Inventor: William E. Humphrey, Oakland, Calif.

[73] Assignee: Humphrey Research Associates, Inc., Oakland, Calif.

[22] Filed: June 20, 1973

[21] Appl. No.: 371,809

[52] U.S. Cl. ................................. 351/26, 351/30
[51] Int. Cl. ........................................... A61b 3/02
[58] Field of Search ................. 351/5, 13, 26, 30, 7

[56] References Cited
UNITED STATES PATENTS
3,598,478   8/1971   Townsley ........................... 351/7 X FOREIGN PATENTS OR APPLICATIONS
237,006   5/1959   Australia .............................. 351/30

OTHER PUBLICATIONS
J. Hahn, "Measuring the Pupillary Distance...," 9-1960, Optical Journal–Review, pp. 43, 46 & 48.

*Primary Examiner*—Paul A. Sacher
*Attorney, Agent, or Firm*—Townsend and Townsend

[57] ABSTRACT

An eye testing device for both subjective and objective testing of the eye is disclosed. Corrective optics having variable spherical and astigmatic inputs are placed at a location remote from a patient's eye. Intermediate the corrective optics and the patient's eyes focusing optics are placed. These focusing optics are preferably in the form of a field mirror. The focusing optics focus a real image of the corrective optics to the patient's eye. A projector projects a real image through the corrective optics to a specifically coherent real image location between the corrective optics and the patient. For subjective eye testing, the corrective optics are varied responsive to subjective patient visual acuity to provide the desired prescription. For objective eye testing, a projector acts as a light source typically projecting an image on the retina of the eye through and into an examiner-patient light path. The corrective optics — placed at the remote location between the examiner and projector on one hand, and the patient on the other hand — are varied responsive to objective patient visual acuity, usually determined by conventional retinoscopic techniques. Thereafter with corrective optics prescribed, examination of the eye, exterior or interior, can occur through the patient-examiner eye path.

27 Claims, 4 Drawing Figures

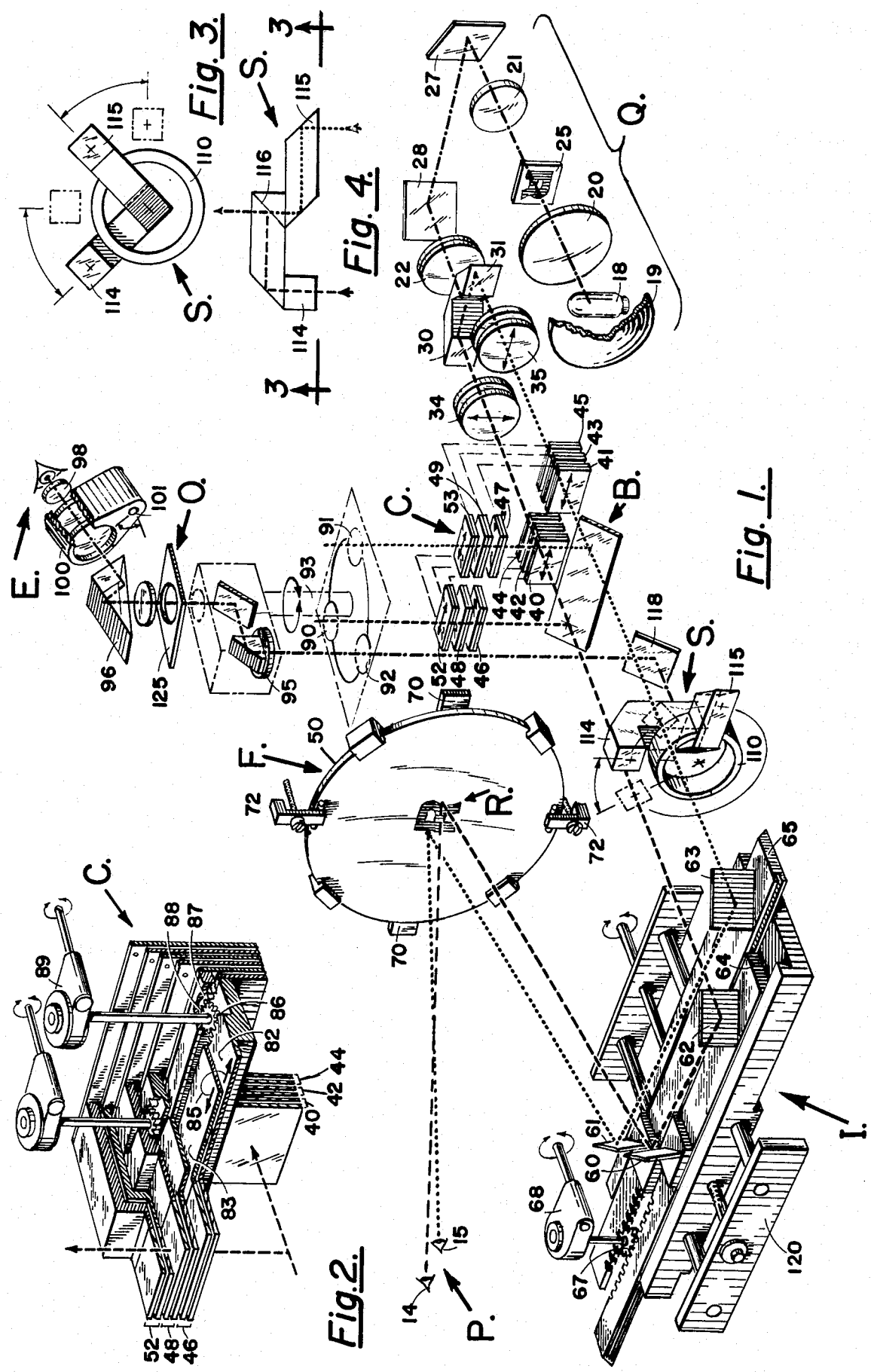

EYE TEST APPARATUS

FIELD OF THE INVENTION

This invention relates to a single eye testing instrument providing subjective and objective eye testing of the eye including refraction, retinoscopy, opthalmoscopy, keratometry, and bimicroscopy functions.

DESCRIPTION OF THE PRIOR ART

Heretofore opthalmologists, optometrists and other examiners who would test and examine the human eye have been required to use separate instruments for separate examinations in the fields of refraction, retinoscopy, opthalmoscopy, keratometry and biomicroscopy. Typically in the office of the person conducting the eye examination, a group of separate instruments for these separate examinations are either mounted to a common post or pivot arrangement, or are alternately hand held in combination with other instruments to conduct testing.

Moreover, corrective optics applied to the eye of a patient have been in the form of relatively complex instrumentation. This complex instrumentation has resulted in at least three undesirable features.

First the patient, in having a large bulk of instrumentation placed immediately in front of his face, often generates subconscious focusing inputs. Specifically the patient, who is unaccustomed to looking through bulky instrumentation, often places into the eye examination subconscious focusing which he would otherwise not have. This subconscious focusing superimposed upon natural eye focusing results in prescriptions which can be erroneous.

Secondly, where patients have large astigmatic corrections, a conventional opthalmoscopic examination becomes extremely difficult. This difficulty with conventional opthalmoscopy comes directly from the requirement that the examiner must view the human eye through a large number of glass interfaces, all of which produce reflection. This reflection from the high number of airglass interfaces greatly deteriorates the conventional opthalmoscopic test, as well as making the test more difficult by forcing the examiner to work further from the eye of the patient.

Finally, the optical cleaning of conventional refractive devices with their multiple pieces of glass is often laborious.

SUMMARY OF THE INVENTION

An eye testing device for both subjective and objective testing of the eye is disclosed. Corrective optics having variable spherical and astigmatic inputs are placed at a location remote from a patient viewing station. Intermediate the corrective optics and the patient viewing station focusing optics are placed. These focusing optics are preferably in the form of a field mirror. The focusing optics focus a real image of the corrective optics typically to the patient viewing station. A projector projects a real and non-diffused image toward the patient through the corrective optics to a real image location. This real image location is between the corrective optics and the patient's eye. For subjective patient eye testing, the corrective optics are varied responsive to subjective patient visual acuity to provide the desired prescription.

For objective patient eye testing, a projector acts as a light source typically projecting a conventional retinoscopic image on the retina of an eye. This projection of the conventional retinoscopic image occurs through and into an examiner-patient light path. The corrective optics, placed at a remote location from the patient between the examiner and projector on one hand, and the patient on the other hand, are varied responsive to objective manifestations of patient visual acuity, usually determined by conventional retinoscopic techniques. Thereafter with the corrective optics prescribed and inserted into the examiner-patient light path, examination of the eye, exterior or interior, can occur through the examiner-patient light path.

FURTHER INVENTION FEATURES

An advantage of this invention is that it provides in a single instrument facilities for subjective eye testing including subjective refraction and facilities for objective eye testing and examination including retinoscopy, keratometry, and biomicroscopy functions.

An additional advantage of this invention is that it avoids in the office of the opthalmologist, optometrist or other eye examiner a multiplicity of instruments. Rather, the most conventional forms of eye testing can be placed into one single instrument. This single instrument, through manipulation, can be made to perform most conventional eye tests.

An additional advantage of this invention is the avoidance of artificial focus inputs into the eye caused by bulky instrumentation immediate a person's face. The eye testing device of this invention requires nothing to be mounted immediately in front of a person's eyes or on his face. Artificial and subconscious focus inputs of the patient can be minimized.

Yet an additional advantage is that the image which is viewed by the patient can be optically altered to be coherent to the patient only. The patient views an artificial real image which is not focused. This artificial real image has optical inputs which, in the general case, are personal to the patient only and cannot be projected on a screen or otherwise diffused. This personal patient coherent image emulates the presence of correctly prescribed optical correction without in fact requiring the patient to view through corrective optics placed immediate his face.

A further object of this invention is to use a field mirror for focusing optics. The field mirror serves the function of focusing optics to image the corrective optics to a real image to the patient's eye.

An advantage of using a field mirror for the focusing optics is that the examiner-patient light path can avoid distortions and aberrations common to lenses, especially reflections from lens air-glass interfaces.

An additional advantage of the utilization of a field mirror for the focusing optics is that the projected image for view by the patient can be imaged at an apparent plane at or near the plane of the field mirror. A patient can be relaxed into believing that the patient coherent image is coplanar with the mirror, and that his view of the image is coincident with the emulated mounting of a chart at the location of the mirror.

A further advantage of using a field mirror for the focusing optics is that a folded light path is utilized. Thus, an instrument having an optimal patient to examiner light path length typically in the order of 20 feet can have the patient to examiner light path folded to less than 10 feet. Moreover, the examiner and patient can be placed in a comfortable confronted position where the examiner can, with ease, directly view the patient from a short distance but remain separated by an interval sufficient to prevent uncomfortable interpersonal contact.

A further object of this invention is to establish parameters for optimal size and focal length of field mirrors used for the focusing optics. Optimally, a 5 foot focal length for the field mirror with a 20 foot light path is used. The field mirror is located 10 feet from the patient. Typically, the real image from the projector is projected to a location nearly coincident with the location of the field mirror.

An advantage of the optimal 5 foot focal length of the field mirror and the projection of an image to coincidence with the field mirror is that there will be minimal focus of the patient related to natural interocular convergence of the patient's eyes.

A further advantage of the field mirror is that an angular offset between the patient-field mirror eye path and the examiner or projector-field mirror eye path can be provided. Correction for off axis view of the field mirror can be easily applied. Beam-splitting optics between the patient and field mirror focusing optics are avoided.

A further object of this invention is to establish a minimal parameter for the use of a field mirror for the focusing optics. Typically, focal lengths below 1 foot 3 inches for the field mirror are not preferred. Moreover, as it is desired to give the patient at least a 6° field of view, a 1 foot diameter mirror is preferred for a 5 foot focal length, and at least a 6 inch diameter mirror is preferred for a 2 foot 6 inch focal length.

A further object of this invention is to provide for movement of the emulated corrective optics relative to the patient's eye. Conventionally refraction, either objectively or subjectively, is conducted at an eyeglass location. Thereafter, in the case of contact lens optics, the prescription is optically adjusted for the corneal location of the prescribed optics. In the present invention, due to the fact that only a real image of the corrective optics is projected to the eye of the patient being tested, the effective location of the real image can be changed. The real image can be placed either at a conventional eyeglass location, at a conventional contact lens location, or at other locations dependent upon the type of optical correction to be used or the type of optical test to take place.

An advantage of this apparent movement of the corrective optics relative to the patient's eyes is that contact lens prescriptions can be directly prescribed superimposed on the corneal position of the patient's eye. Prescription of the contact lenses at the standard eyeglass location with optical adjustments to the prescription for the corneal location is not required.

An additional advantage of this apparent corneal location of the corrective optics is that patient distortion, especially introduced with the correction of astigmatic errors, can be minimized. Optical testing can occur with minimal astigmatic distortion to disturb patient viewing.

Yet a further object of this invention is to provide for examiner interloping in the eye-testing path to permit objective eye examination. The examiner-patient eye examination path is routed through corrective optics.

An advantage of this aspect of the invention is that the examiner can interlope into the light path of the instrument to conduct objective eye examinations at a location permitting close-up eye examination with the examiner and patient relatively remote one from another.

A further object of this invention is to minimize reflections to the examiner-patient light path. This is optimally provided by placing a beam-splitter for the respective light paths between identical paired sets of corrective optics. One set of corrective optics is for the examiner-patient eye path. The other set of corrective optiics is for the patient-projector light path.

An advantage of placing the beam-splitter between the corrective optics for the projector and the patient on one hand, and the corrective optics for the examiner and patient on the other hand, is that the problem of intense reflection of the projector from impinging upon corrective optics air-glass interfaces is minimized. Light losses from the projector impinging upon the air-glass interfaces of the corrective optics are not reflected into the examiner-patient eye path. Rather, they are reflected to locations where they have no impact on the examiner-patient light path.

A further object of this invention is to provide mechanisms for applying identical corrective optics to the examiner-patient light path as well as the patient-projector light path. According to this aspect, paired identical variable focus lenses are mounted to brackets which move relative to the examiner-patient and projector-patient light paths. By placing a beam-splitter to project a portion of the light path to the examiner through one variable power lens, and to project the projector image through an identical location on the other variable focus lens, identical optical correction can occur at both light paths.

A further object of the focusing optics of this invention is that a real image of the patient's eye is projected to a position which is remote from the patient along the light path. The examiner can intimately examine the patient's eye at this remote position without becoming uncomfortably close to the patient.

A further advantage of this aspect of the invention is that opthalmoscopic examination of the human eye from a remote location can occur. This can occur even in the presence of radical astigmatic corrections.

Yet another object of this invention is to provide for remote measurement of patient interocular spacing. According to this aspect of the invention, the light path from each of the respective eyes of the patient are dog-legged through a multiple mirror configuration. By relative movement of the multiple mirrors transverse or across the light path for each separate eye, the interocular spacing of the eye can be measured as a function of mirror relative movement.

An advantage of this aspect of the invention is interocular spacing can be determined while the patient is conventionally viewing a remote target.

DESCRIPTION OF THE DRAWINGS

FIG. 1 is a perspective view of the eye test apparatus according to this invention illustrating the patient-projector eye path as well as the patient-examiner eye path;

FIG. 2 is a view of the corrective optics and the apparatus for relatively moving the corrective optics;

FIG. 3 is a view of specialized optics for examining both eyes simultaneously; and, FIG. 4 is a schematic of the apparatus shown in FIG. 3.

DESCRIPTION OF THE PREFERRED EMBODIMENTS

Referring to FIG. 1, a perspective view of the eye testing device of this instrument is illustrated. Typically, a patient P schematically shown by left eye 14 and right eye 15 is shown viewing focusing optics F. Focusing optics F retrodirect a light path to interocular drive I and to corrective optics C. Interocular drive I functions to adjust the instrument for variable patient interocular spacing.

Corrective optics C are shown in two locations. A first set of corrective optics lie between the patient P and a projector Q. Additionally, identical corrective optics C are located between the patient and the viewing examiner E. The viewing examiner E looks through examining optics O and interlopes at a beam-splitter B into the patient-projector eye path. Specialized optics S and interocular drive I for superimposing both eyes of the patient P to the view path of the examiner E are illustrated.

Patient P with his left eye 14 and right eye 15 views focusing optics F. Typically, the patient must be provided with a headrest or the like to maintain his eyes within given tolerances from the focusing optics F along the light path of the optical testing device. It should be understood that chin rests have deficiencies for this purpose as movement of the jaw in talking moves the eyes in viewing. Conventional headrests having headrest and bracing locations other than the chin will be sufficient to brace the patient for purposes of an examination.

Projector Q is a projection apparatus. A light source 18 and light projecting optics 19, 20, 21 and 22 function together to project an image of a slide 25. Projecting optics 19, 20, 21 and 22 are adjusted relative to slide 25 so as to project a real image R, hereshown as the letter R to focus at a near infinite distance. The corrective optics C serve to bring the real image R coplanar with focusing optics F.

Projector Q includes specially adapted optics for the eye testing device hereshown. Mirrors 27 and 28 are hereshown positioned to retrodirect the light path from projector 25. These mirrors are hereshown placed intermediate lens elements 21 and 22 of the projector.

Secondly, the projected light from the projector 22 passes through periscopes 30 and 31. Periscopes 30 and 31 respectively serve to project images for eyes 14 and 15 by splitting the image from the optics 22 into two separate paths, one path for each eye.

As required in conventional eye testing optics, the light paths must be compensated for traditional "wall-eye" or "cross-eye" corrections. Accordingly, relatively movable negative and positive lens pairs 34 and 35 are shown in each of the light paths to patient eyes 14 and 15 respectively. The negative-positive lens pair 34 has the positive and negative lens elements equipped for relative movement in the vertical direction. The negative-positive lens pair 35 has the negative-positive lens equipped for relative movement in a horizontal direction. As is known in the art, by conventional movements and corresponding measurements of the displacements of lens pairs 34 and 35, the power and rotation of wall-eye and cross-eye prism prescriptions can be made. In practice, it is advantageous to move one lens of each pair together horizontally, and to move the other lens of each pair together vertically.

Corrective optics C are illustrated in two locations. For the purposes of a preliminary understanding of this invention, the corrective optics C in the projector Q-patient P light path will first be discussed. Beam-splitter B, specialized optics S, and interocular drive I will all be ignored with stress only being given to focusing optics F. Thereafter, and with reference to the patient P-examiner E light path, the function of interocular drive I, specialized optics S, and beam-splitting optics B will all thereafter be set forth.

Corrective optics C consists of relatively movable variable focal length or variable spherical optics 40 for the eye path of patient eye 14 and relatively movable variable focal length or variable spherical optics 41 for the eye path of patient eye 15. Both of these optics consist of paired variable focal length lenses which move relative to one another to achieve the desired spherical correction necessary to prescribe for the patient. Such paired countermoving optical elements are fully described and set forth in the Luis W. Alvarez U.S. Pat. No. 3,305,294 entitled "Two-Element Variable-Power Spherical Lens," and the Luis W. Alvarez and William E. Humphrey U.S. Pat. No. 3,507,565 entitled "Variable-Power Lens and System."

Additionally, astigmatic inputs for correction of patient P astigmatism are required. These astigmatic inputs occur at relatively movable lens pairs 42 and 44 for eye 14, and 43 and 45 for eye 15. The configuration of each of the pairs of lens optics 42–45 as well as the effect of correction which occurs upon lens optic relative movement is fully described in William E. Humphrey U.S. Pat. No. 3,751,138 entitled "Variable Anamorphic Lens and Method for Constructing Lens" (Patent Application Ser. No. 235,134, filed Mar. 16, 1972).

One comment can be made about the astigmatism generated by variable astigmatic lens pairs 42 and 43 on one hand, and 44 and 45 on the other hand. Typically these variable astigmatic lenses are selected so that variable astigmatic lens pairs 40 and 42, for example, generate astigmatism along rotational alignments 45° one from another. Thus by relative movement of the lens pairs of each of the elements 42–45, virtually all optically practical astigmatic prescriptions can be generated.

Ignoring for the present discussion the function of specialized optics S and noting only the retrodirecting and displacing effect of interocular drive I, the function of focusing optics F can now be discussed.

Focusing optics F function to focus a real image of the corrective optics C to the eyes 14 and 15 of patient P. Stated in other terms, the real image R projected by the projector Q through the corrective optics C is the same as if the corrective optics C were removed from their location in the projector light path and placed immediately in front of eyes 14 and 15 of patient P.

Several observations can be made about the focusing optics F.

First, the real image R viewed by the patient at eyes 14 and 15 is specific to the patient's own optics. In the case of a patient having no optical correction required, the image R could be projected and seen at a screen placed within the plane of focusing optics F. It should be noted that the focusing optics F are generally very efficient, and an image which appears bright using F would appear very dim when projected on a diffusing screen.

It should be understood, however, that where eyes 14 and 15 of the patient P require optical prescription to achieve optimum vision (particularly an astigmatism correction), the image R as viewed by the patient is coherent to the patient only. The image, if projected onto a screen, instead of being directly viewed by a patient P, would not contain an optically coherent correction even to the patient P'. It is required that the image be viewed by the patient P looking directly toward the projector Q along the light path of the testing device without projection of the image on a surface which then displays the image by diffusion (as in the case of the conventional image projected onto a screen).

It should be noted at this juncture that this is the precise feature which enables a patient to have no obstruction between his eyes and the projected real image R that he sees. Rather, the patient is visualizing a real image R which is projected to him with coherency which only he can view (provided that some type of optical prescription is required).

Focusing optics F required for projecting a real image of the corrective optics C to the eyes 14 and 15 of patient P are hereshown in the form of field mirror 50. It should be understood that a conventional lens or lenses which accomplish this function could as well be employed in this invention. However, the focusing optics F hereshown in the form of field mirror 50 are particularly preferred, and produced numerous consequences not immediately apparent.

Field mirror 50 is a concave mirror. The mirror is oriented relative to the patient P and the interocular drive I so that a line between the center of the mirror and its point of spherical generation (mirror axis) falls substantially equidistantly between the patient P and mirrors 60 and 61 of interocular drive I.

The light path incident from the patient's eyes to mirror 50 is at an angle relative to the light reflected from mirror 50 to mirrors 60 and 61 of interocular drive I. Typically, the angle of incidence at the mirror for rays between the patient and mirror measured from the mirror axis (defined between a point about which the mirror is spherical and a straight line from the point to the mirror) is limited to an angle of 10°. This is because a conventional spherical field mirror when viewed at an angle produces cylinder or astigmatic input as a quadratic function of the increase of the angle of incidence at the mirror.

It will be appreciated that the astigmatic effect due to the angle of incidence and the angle of reflection from field mirror 50 can be eliminated by the use of beam-splitting optics between patient P and interocular drive I on one hand, and field mirror 50 on the other hand. However, due to the light loss encountered in conventional beam-splitting optics and other optic effects, such a configuration is not preferred.

Additionally, and where light angularly impinges on field mirror 50, it has been found that at least a 9 inch offset is desired between eyes 14 and 15 of patient P on one hand, and mirrors 60 and 61 of interocular drive I on the other hand. Requiring a 9 inch offset with an angle of incidence or angle of reflection of approximately 10°, it can be seen that the field mirror 50 must be substantially 2½ feet from patient P or from interocular drive I along the desired light path.

Reference has also been made to the cylinder effect or astigmatic effect of mirror 50 due to the increasing angle of incidence or angle of reflection to or from mirror 50. Mirror 50 can be manufactured with an aspherical surface to correct this astigmatic input. More efficiently, mirror 50 can be elastically deformed by bar 70 and brackets 72. Specifically, and where the eyes of patient P directly overlie mirrors 60 and 61 of interocular drive I, an aspheric astigmatic correction can be elastically made to mirror 50 by pulling in at brackets 72 at the top of field mirror 50 and pushing outwardly on the sides of field mirror 50 at bar 70.

It has been found that the preferred distance between patient P and field mirror 50 is in the range of 10 feet. Typically, and at distances less than 10 feet, the eyes 14 and 15 of a patient P simultaneously converge and subconsciously focus to their respective points of ocular convergence. At 10 feet and beyond, focusing as a result of the ocular convergence of the eyes 14 and 15 of the patient P is not appreciable.

Moreover, it should be remembered that it is desirable to have coincidence between the real image R that patient P sees and the vicinity of the mount of the mirror 50. Therefore, it has been found the real image R projected by projector Q should be nearly coincident with the plane of the focusing optics F, hereshown as field mirror 50. The patient can thus view the focusing optics of field mirror 50 as if it were a conventional eye chart mounted in co-planar relation with mirror 50.

Additionally, and for all standard eye examinations of patients, it has been found desirable to provide a field of view in the order of 6°. It is therefore preferred to have a mirror 10 feet from patient P in the order of 1 foot diameter. In the case of a mirror 5 feet from patient P, the mirror should be in the order of 6 inches diameter or larger.

Returning to a brief description of the reflective properties of interocular drive I, it will be noted that the light path from eye 14 of patient P impinges upon field mirror 50, mirrors 60 and 62 of interocular drive I to relatively moving lens pairs 40, 42 and 44. Similarly, the light path from eye 15 of patient P impinges upon field mirror 50, mirrors 61 and 63 of interocular drive I and corrective optics relatively moving lens pairs 41, 43 and 45. Thus, independent adjustments to the corrective optics at relatively moving lens pairs 40, 42 and 44 all produce corrections to eye 14 of patient P. Similarly, independent adjustments to relatively moving lens pairs 41, 43 and 45 all produce corrections to eye 15 of patient P.

Corrective optics C must lie between the real image R of projector Q and the slide of image R which is projected. Location of the corrective optics C at either the real image R, or at the slide in the projector Q will not be operative.

Understanding this much of the invention set forth, and ignoring beam-splitter B and the observing light path O to examiner E, a subjective refraction of patient P can now be discussed.

Basically, patient P is asked to look at the real image R projected on focusing optics F. Thereafter, spherical correction is made by relative movement of the variable lens pairs 40 for patient eye 14, and 41 for patient eye 15 until optimum vision of the real image R occurs. Thereafter, astigmatic input can be made by sequential relative movement of relatively moving lens variable lens pairs 42 and 44 for the left eye 14 of patient P, and relatively moving lens pairs 43 and 45 for the right eye 15 of patient P.

Typically, the lens sequence of operations of relatively moving lens pairs 40, 42 and 44 will be repeated twice to obtain an optimum refraction for patient eye 14. Similar repeat of the sequence of operations of adjustment of relatively moving lens pairs 41, 43 and 45 will be made to achieve adjustment for eye 15.

It will be understood by those skilled in the art that dependent upon the magnification of the focusing optics F hereshown as field mirror 50, the amount of correction actually placed into the corrective optics C will provide a different effective correction to the patient P at the patient viewing station. Usually the instrument will be constructed for unit magnification. In these circumstances, the diopter correction applied at the corrective optics C will relate precisely to the effective diopter correction that the patient views.

Where, however, the effective magnification of the focusing optics is other than unity, the diopter correction for the patient Dp is related to the diopter correction at the corrective optics Dc as follows: $Dp = Dc(M^2)$ where M is the ratio of the focusing optics (field mirror) to corrective optics distance over the focusing optics to patient eye distance.

Having set forth the function of this instrument to provide a subjective refraction, attention can now be given to the examiner-patient light path. Typically, the examiner-patient light path is detoured at a beam-splitter B. It will be observed that the detour of beam-splitter B is between corrective optics C at lenses 40–45 and the patient P. There is an important reason for this placement.

It has been found that the relatively intense light of projector Q when projected through corrective optics C causes many reflections at the air-glass interfaces provided by the relatively moving optics of lens pairs 40–45. Ideally, these reflections from the relatively moving lens pairs should not be reflected into the examiner-patient light path. Therefore, by the placement of beam-splitter B between the corrective optics C and the patient P, all reflections of the corrective optics C relative to projector Q will pass into the projector Q light path and not the examiner E light path.

Beam-splitter B functions to divide out light from the projector Q. It has been found preferable to detour 80% of the light from the eyes of patient P to the examiner E. This unbalance of beam-splitter B can be compensated for by providing a relatively high output from projector Q. It has also been found useful to provide a beam-splitter composed of a fully reflective surface with one or more small apertures in the reflective surface through which illumination may be passed to the patient P, while return light is collected from the fully reflective area. In this way, the optics may be adjusted so that the small apertures lie reimaged in the plane of the cornea, and the corneal reflection is, in turn, reflected to the area of small apertures, and hence only poorly reflected into the optical path of examiner E.

To provide an objective eye examination of patient P it is necessary that the examiner E look through corrective optics C, which corrective optics C are identical to those corrective optics through which projector Q projects the real image R. Accordingly on each side of beam-splitter B there are provided identical relatively moving variable lens pairs corresponding to each of the variable lens pairs previously described.

It is not intended to exclude the possibility of placing the beam-splitter between a single corrective optics C and projector Q; however, present day antireflective coatings are not sufficiently effective to provide as high a quality result as the approach hereshown.

Take the case of eye 14 and variable spherical optics 40, and variable astigmatic optics 42 and 44. Typically, variable spherical optics 46 identical to variable spherical optics 40 are provided. Similarly, variable astigmatic optics 48 identical to variable astigmatic optics 42 are provided. Finally, variable astigmatic optics 52 identical to variable astigmatic optics 44 are provided.

It will be remembered that each of the variable lens pairs comprises two pieces of relatively moving glass which generate the variable lens effect, be it astigmatism or conventional spherical lens correction. Accordingly, it is desirable to use identical lens elements for each of the correspondent pairs of optics above mentioned. Furthermore, it is desirable to produce precisely identical relative movement between the relatively moving lens pairs.

Precisely identical lens movement must occur between the relatively moving pieces of glass of lens pairs 40 and the relatively moving pieces of glass of lens pairs 46. Similarly, precisely identical lens movement between the relatively moving pieces of glass pairs 42 must be identical to the movement of the pieces of lens pairs 48. Finally, precisely identical movement between the pieces of glass of lens pairs 44 must be identical to the relative movement of the pieces of glass of lens pairs 52. A mechanism which produces this movement can be seen with reference to FIG. 2.

Referring to FIG. 2, relatively moving lens pairs 40 are each shown attached to brackets 80 and 81. Similarly, relatively moving lens pairs 46 are attached to brackets 82 and 83. Each of the brackets 80 and 81 on one hand, and 82 and 83 on the other hand, are mounted for relative sliding movement with respect to one another along the direction of the arrows 85.

Identical movement of the lens elements is produced by opposed racks driven from a common pinion. Basically bracket 82, which is rigidly connected with bracket 80, defines a first rack 86. Similarly bracket 81, which is rigidly connected to bracket 83, defines a second opposed rack 87. A pinion 88 and pinion drive 89 move the racks in equal and opposite directions. Thus the paired lens elements of variable spherical lenses 40 move equally and opposite to the identical variable spherical lens optics 46.

As is illustrated in FIG. 2, identical structure for variable astigmatic lens optics 42 and 48 produces identical relative movement. Similarly, identical structure for lens elements 44 and 52 produces identical relative movement for the identical astigmatic lens elements, the drive members here not being shown.

It will be appreciated that the apparatus shown in FIG. 2 only produces variable prescription for eye 14 of patient P. Identical apparatus must be provided for lens pairs 41, 43, 45, 47, 49 and 53 for right eye 15 of patient P. This apparatus will not be described as it is merely a repeat of the apparatus previously described with reference to FIG. 2.

Returning to the description of the patient P-examiner E light path, the light path diverted by beam-splitter B and passing through examiner corrective optics C proceeds typically through apertures 90 and 91. Apertures 90 and 91 are radially equidistant from a shaft 93 about which periscope optics 95 revolve. As is apparent, registry of the inlet of periscope 95 with aperture 90 will allow the examiner E to interlope on the light path to patient's eye 14. Similarly, registry of the inlet of periscope 95 with aperture 91 will allow the examiner E to interlope on the light path to patient's eye 15.

After passing through periscope optics 95, light is diverted upwardly to prism 96 and eyepiece 98 to examiner E. Examiner E can thus observe either eye 14 or eye 15 of patient P.

Examiner E will wish two separate views of each of the respective eyes of patient P. Typically for biomicroscopy and opthalmoscopy, where examination of the various interior layers of the eye such as the retina are conducted, the image of the patient's eye produced for examiner E must be relatively closer to the examiner E. For this purpose a conventional Bertrand lens assembly 100 is mounted about a pivot 101 and moved into the examiner E-patient P light path.

Additionally, and for examination of the exterior of the eye such as that required for retinoscopy, keratometry and biomicroscopy on the various exterior layers of the eye, Bertrand lens assembly 100 will be rotated about pivot 101 out of the examiner E-patient P light path.

Having set forth the examiner-patient optics from beam-splitter B to examiner E, attention can now be directed to the interocular drive I.

Interocular drive I includes first and second relatively moving racks 64 and 65. Rack 64 rigidly mounts mirrors 60–62 from the light path 14 of patient P. Rack 65 rigidly mounts mirrors 61–63 from the light path from patient's eye 15.

Those skilled in eye examination art are well aware of the physical fact that the interocular spacing for different patients varies between relatively wide limits. In the design of this optical instrument, it has been found that the interocular spacing for both projector Q and examiner E must be the same. Thus, the instrument must accomodate the variable ocular spacing of the eyes 14 and 15 on one hand, and yet project from the interocular drive towards examiner E or projector Q a constant ocular spacing typically in the order of 10 cm.

Mirror pairs 60 and 62 on one hand, and 61 and 63 on the other hand, are hereshown as roof mirrors. It has been found that by counterrelative and transverse movement of racks 64 and 65 provided by a pinion 67 and a drive 68, individual adjustment transverse of the light path of the roof mirrors can occur. This transverse adjustment preserves the same length of light path, provides for a variably spaced input to interocular drive I from patient P, and at the same time produces an identically spaced parallel light output from interocular drive I to projector Q and examiner E.

Interocular drive I in combination with specialized optics S has another advantage. Specifically, remote measurement of the interocular spacing of the patient P is possible. This function utilizes specialized optics S.

Specialized optics S can be understood with respect to FIGS. 1, 3 and 4. Typically, a cylinder section 110 is rotatably mounted to a support not shown. The cylinder section includes a left eye periscope 114 and a right eye periscope 115. The outputs of periscopes 114 and 115 are combined through a beam-splitter 116. Typically, the periscopes are disposed at 45° one to another. These periscopes, at their input end, have a spacing of 10cm identical to the spacing between the ocular outputs from interocular drive I. The periscopes have their respective output at the center of the cylinder 110 through beam-splitter 116.

Referring to FIGS. 1 and 3, movement of the specialized optics S to intercept or not to intercept a light path from the patient's respective eyes 14 and 15 can be understood.

When specialized optics are disposed with periscope 114 in the vertical position, and periscope 115 in the horizontal position, the respective light paths from the patient's eyes 14 and 15 bypass the periscopes. No light between the patient P and projector Q, or the patient P and examiner E is interfered with.

Periscopes 114 and 115 can be rotated on cylinder 110 an angle of 45° counterclockwise. The rotation will typically occur from the disposition of specialized optics S shown in FIG. 1 to the disposition of specialized optics S shown in FIG. 3. In this position, periscope 114 interferes with the light path of eye 14 from patient P. Similarly, periscope 115 interferes with the light path of eye 15 of patient P.

Typically, light is detoured to a mirror 118 and through an aperture 92. As should be apparent to those having skill in the art, the examiner E by registry of his periscope assembly 95 over aperture 92 can view a superimposed image of the patient's eyes 14 and 15. Typically, by relating the correspondent relative movement between the racks 64 and 65 to a scale, the interocular spacing of a patient can be conveniently determined by remote measurement. Specialized optics S can alternately be placed in the examination optical path O as part of prism structure 95, or as an alternate substitution structure to 95.

Interocular drive I has an additional function. It will be remembered that the function of focusing optics F was to focus a real image of the corrective optics C to the eyes of the patient P. Typically, the real image of the corrective optics C can be at two locations. The first location is the conventional eyeglass location on the bridge of a patient's nose. The second location is the conventional contact lens location on the cornea of the patient's P eyes 14 and 15. Other locations may be preferred for certain tests such as opthalmoscopy where the beam-splitter may be imaged at the cornea.

The amount of adjustment of the interocular drive towards and away from the patient to produce corresponding shift of the image of the corrective optics at the patient can be readily understood. The resulting shift of the corrective optics can be described by the formula $$D = \frac{2}{M^2} S$$

where S equals the shift of the interocular drive towards and away from the patient; M is the ratio of the field mirror to corrective optics over the field mirror to eye distance along a central ray; and, D is the amount of effective correction optics shift.

Interocular drive I is movable towards and away from patient P. In movement towards patient P, the optical path between corrective optics C and focusing optics F is lengthened. Movement of the real image of the corrective optics C away from the cornea of patient's eyes 14 and 15 occurs.

Similarly, movement of interocular drive I away from patient P shortens the light path. Movement of the real image of the corrective optics C to an eyeglass location at the cornea results. It has been found that movement of the interocular drive I towards and away from patient P can be easily affected by a drive 120.

It should be realized that other expedients can result in the apparent movement of the corrective optics C relative to patient P. For example, actual movement of corrective optic C or focusing optic F, while not as desirable, can suffice to produce this apparent movement of the real image of corrective optic C to the eys of the viewer.

Some attention to the use of the apparatus illustrated herein for conventional retinoscopy can be given.

Typically, the projector Q is altered to project an image past one or more knife edges. Typically this image is produced by placement of an aperture at the position of slide 25. Secondly, a knife edge is placed at a conjugate location of the image of the patient's eye 14 along the examiner E light path. Such a conjugate location is shown at slide 125.

The examiner E examines the pupil of the selected eye. First, he analyzes the variation of reflex intensity across the pupil in a direction perpendicular to the edge direction to indicate spherical error. The spherical correction can be adjusted to neutralize the spherical error. Thereafter he examines the variation of reflex intensity across the pupil in a direction along the edge direction to determine astigmatism along a cylinder axis at 45° to the slit orientation. This astigmatism corresponds to one of the astigmatism corrections, and can be neutralized by adjustment of the appropriate control.

After this initial retinoscopy, examiner E then changes the alignment of the slit at slide position 25 and the conjugate slit at slide position 125 by 45°. He then can examine the retinal reflex as just described to complete the determination of spherical and astigmatic corrections. With these steps, the examiner can easily produce an objective refraction.

It should be noted that in some tests it is desirable to present patient P with independent test images containing different target material (for the purpose of establishing a patient's stereo fixation abilities, for example). Frequently, considerable trouble is required to achieve this result, such as use of special polarizing material and polarizing lenses near the patient. In the present instrument, one particularly simple method is available. The slide can be divided into a right and left half field. By adjustment of prisms (or mirrors) 30a and 31a to a second alternate angle position, the centers of right and left slide fields can be made to correspond at the center of field R to provide a true stereoscopic image to patient P without accessories to the patient's vision. Note that unwanted portions of the slide field will also be projected, but these "ghosts" can be arranged to fall beyond the field of R and hence be so inefficiently presented to patient P as to be virtually invisible by virtue of the diffusing nature of the real image of R.

It should be apparent that the instrument herein disclosed is of great utility. While attention to the modification of the instrument for many functions has been given, it should be obvious that this invention will admit numerous changes and modifications without departure from the teachings set forth herein.

What is claimed is:

1. An eye testing device comprising: a patient viewing station; a projector; at least one light path between said patient viewing station and said projector; said projector including at least one target for projection and projecting optics for projecting at least one image to be viewed by a patient at a distance removed from said patient along said light path; corrective optics for emulating said patient's opthalmological prescription for placement in said light path at a location between said projecting optics and said patient; focusing optics of preselected focal length removed by a distance greater than said focal length from said corrective optics toward said patient for focusing a real image of said corrective optics to the optical position of said patient's ophthalmological prescription proximate said patient's eye.

2. The invention of claim 1 and wherein said focusing optics is a field mirror.

3. The invention of claim 1 and wherein said projector projects said image at said focusing optics.

4. The invention of claim 1 and means for changing the length of said light path to said patient viewing station for causing apparent movement of said real image of said corrective optics towards and away from said patient viewing station.

5. The invention of claim 4 and wherein said means for changing the length of said light path includes a mirror in said light path and means for moving said mirror relative to said light path.

6. An eye testing device comprising: a patient viewing station; an eye examination station; a light path between said patient viewing station and said eye examination station; corrective optics for emulating said patient's opthalmological prescription at a location between said eye examination station and said patient viewing station; focusing optics in said light path between said patient viewing station and said corrective optics; said focusing optics of preselected focal length removed by a distance greater than said focal length from said corrective optics toward said patient for focusing a real image of said corrective optics to the optical position of said patient's ophthalmological prescription proximate said patient's eye and to focus a real image of said patient's eyes through said corrective optics to a position proximate said eye examination station.

7. The invention of claim 6 and wherein said focusing optics is a field mirror.

8. The invention of claim 6 including means for changing the length of said light path to said patient viewing station for causing apparent movement of an image of said corrective optics towards and away from said patient viewing station.

9. The invention of claim 8 wherein said means for changing the length of said light path includes a mirror in said light path movable relative to said light path.

10. An eye testing device comprising: a projector for projecting an image; a patient viewing station for providing at least one eye of a patient with a view of said image from said projector along a first light path from said projector to said patient viewing station; a second light path from said patient viewing station to an eye examining station, said second light path having a portion thereof coincident with said first light path; corrective optics at a location between said projecting optics and said patient, said corrective optics for emulating said patient ophthalmological prescription remote from said patient viewing station for producing corrective inputs to said first and second light paths; focusing optics of preselected focal length removed by a distance greater than said focal length from said corrective optics to the optical position of said patient's ophthalmological prescription, said focusing optics further arranged and disposed to focus a real image of said patient's eyes through said corrective optics to a position proximate said eye examination station; and, beam-splitting optics between said patient viewing station and said projector to detour said second light path from said first light path to said eye examination station.

11. The invention of claim 10 and including means for changing the length of said light path to said patient viewing station for causing apparent movement of an image of said corrective optics towards and away from said eye examination station.

12. The invention of claim 10 and wherein focusing optics is a field mirror.

13. The invention of claim 10 and wherein said projector projects said image at said focusing optics.

14. The invention of claim 10 and including a first set of corrective optics between said beam-splitting optics and said projector in said first light path; a second set of corrective optics between said beam-splitting optics and said eye examination station in said second light path; and, means interconnected between said first and second corrective optics for producing identical corrective inputs to said first and second light paths from said first and second sets of corrective optics.

15. An eye testing device comprising: a field mirror having a focal length of at least 1 foot 3 inches and being substantially spherical with respect to a point in space; a patient viewing station; a first light path between said patient viewing station and said field mirror; the portion of said first light path incident upon said field mirror at an angle of incidence of less than 10° at the point of incidence of said first light path; a projector; a second light path between said field mirror and said projector; the portion of said second light path at said field mirror coinciding with said portion of said first light path at said field mirror; said projector including a target for projection and projecting optics for projecting an image to be viewed by a patient at a distance removed from said patient along said light path; corrective optics for emulating said patient's opthalmological prescription at locations between said projecting optics of said projector and said patient; said field mirror removed by greater than said 1 foot 3 inches from said corrective optics towards said patient along said light paths for focusing a real image of said corrective optics to the optical position of said patient's ophthalmological prescription proximate said patient's eye.

16. The invention of claim 15 and including an eye examination station; a third light path to said eye examination station; means for detouring a portion of at least one of said first and second light paths through said corrective optics to said eye examination station.

17. The invention of claim 16 and including a first set of corrective optics between said detouring means and said projector; a second set of corrective optics between said detouring means and said eye examination station; and, means interconnected between said first and second corrective optics for producing identical corrective inputs to said first, second and third light paths from said first and second sets of corrective optics.

18. The invention of claim 15 and wherein the focal length of said field mirror is 5 feet.

19. The invention of claim 15 and including means for astigmatically correcting said field mirror relative to the angle of incidence of said first light path upon said mirror.

20. The invention of claim 15 and wherein said field mirror has a diameter with respect to said patient viewing station to provide a patient at said patient viewing station with a field of view of at least 6°.

21. An eye testing device comprising: a field mirror having a focal length of at least 1 foot 3 inches and being substantially spherical with respect to a point in space; a patient viewing station; a first light path between said patient viewing station and said field mirror; the portion of said first light path incident upon said field mirror at an angle of incidence of less than 10° at the point of incidence of said first light path; an eye examination station; a second light path between said field mirror and said eye examination station, the portion of said second light path at said field mirror coinciding with the reflection of said first light path from said field mirror; corrective optics for emulating said patient's ophthalmological prescription at locations between said projecting optics of said projector and said patient for placement in said light path remote from said patient viewing station; and, said field mirror removed by greater than said 1 foot 3 inches from saidi corrective optics toward said patient along said light paths to focus a real image of said corrective optics to the optical position of said patient's ophthalmological prescription proximate said patient's eye and to focus a real image of said patient's eyes to a position proximate said eye examination station.

22. The invention of claim 21 and including a projector; a third light path from said projector through said corrective optics and into said light paths; said projector disposed with respect to said light paths for projecting light to said patient viewing station.

23. The invention of claim 22 and including a first set of corrective optics in said second light path; a second set of corrective optics in said third light path; and, means interconnected between said first and second corrective optics for producing identical corrective inputs to said first, second and third light paths from said first and second sets of corrective optics.

24. The invention of claim 21 and wherein the focal length of said field mirror is in the range of 5 feet.

25. The invention of claim 21 and wherein said patient viewing station and said eye examination station are proximately equidistantly spaced along said light path from said field mirror.

26. The invention of claim 1 and including first and second light paths between said patient viewing station and said projector, said first light path for said patient's left eye and said second light path for said patient's right eye.

27. The invention of claim 26 where said projector projects a plurality of images with at least one image for said left eye and another image for said right eye.

* * * * *